June 5, 1934.  J. M. DAYTON  1,961,414
FLOW METER FOR LIQUIDS
Filed March 23, 1931  2 Sheets-Sheet 1
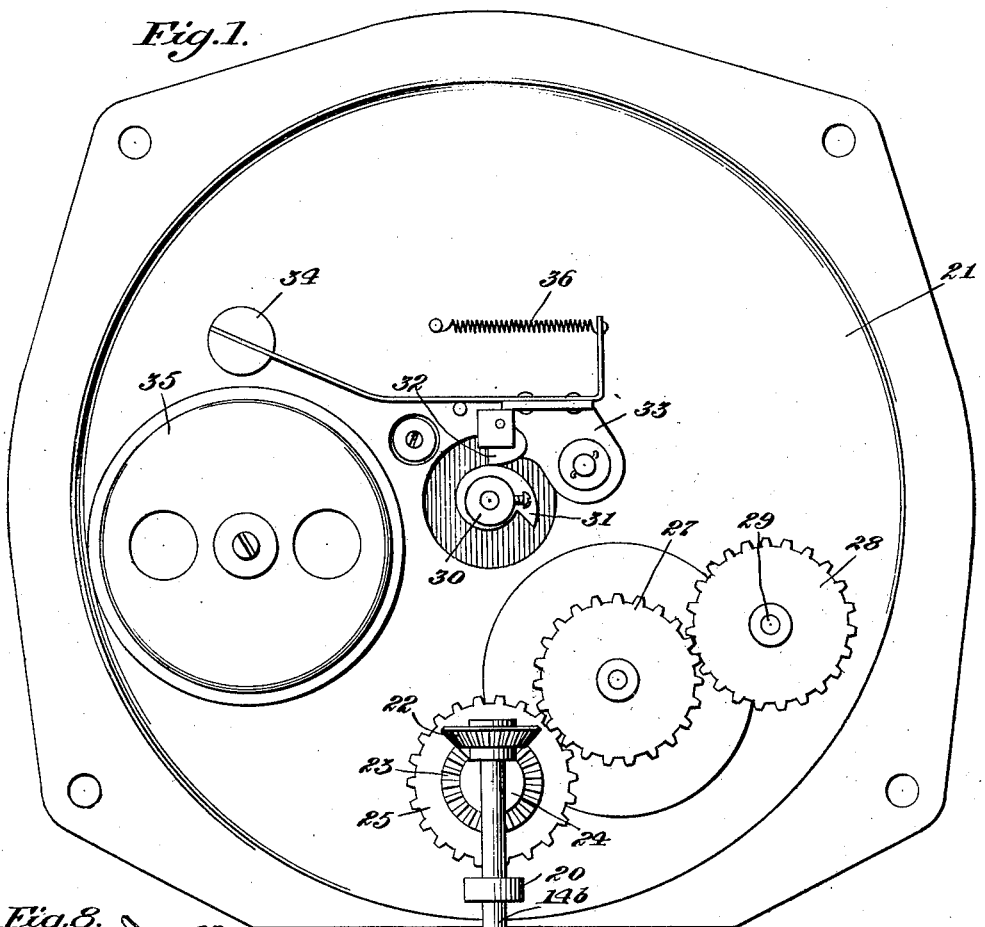
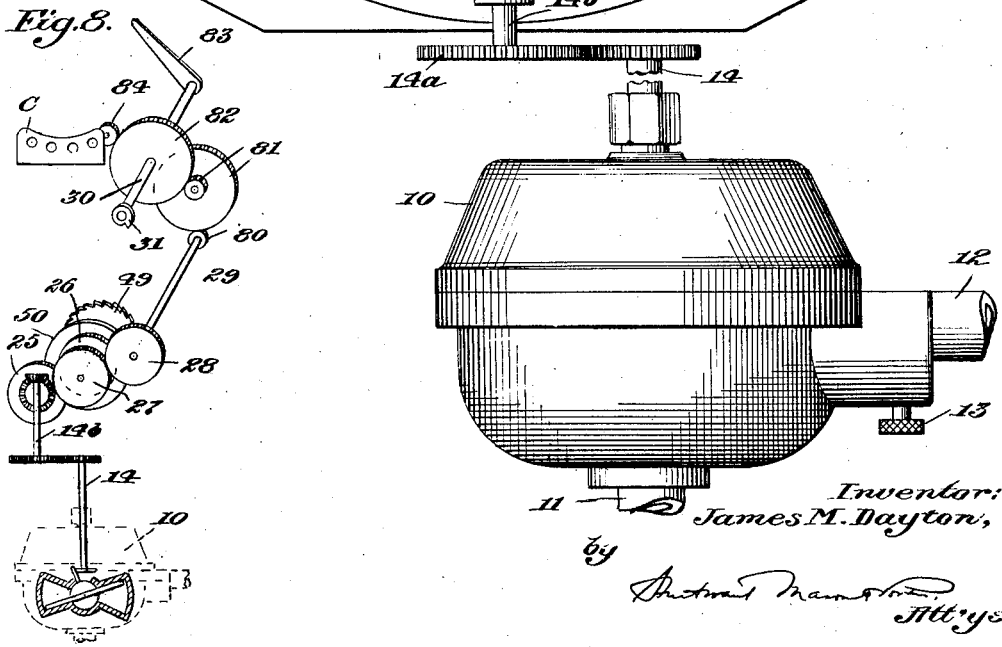
Inventor:
James M. Dayton,
by
Attys.

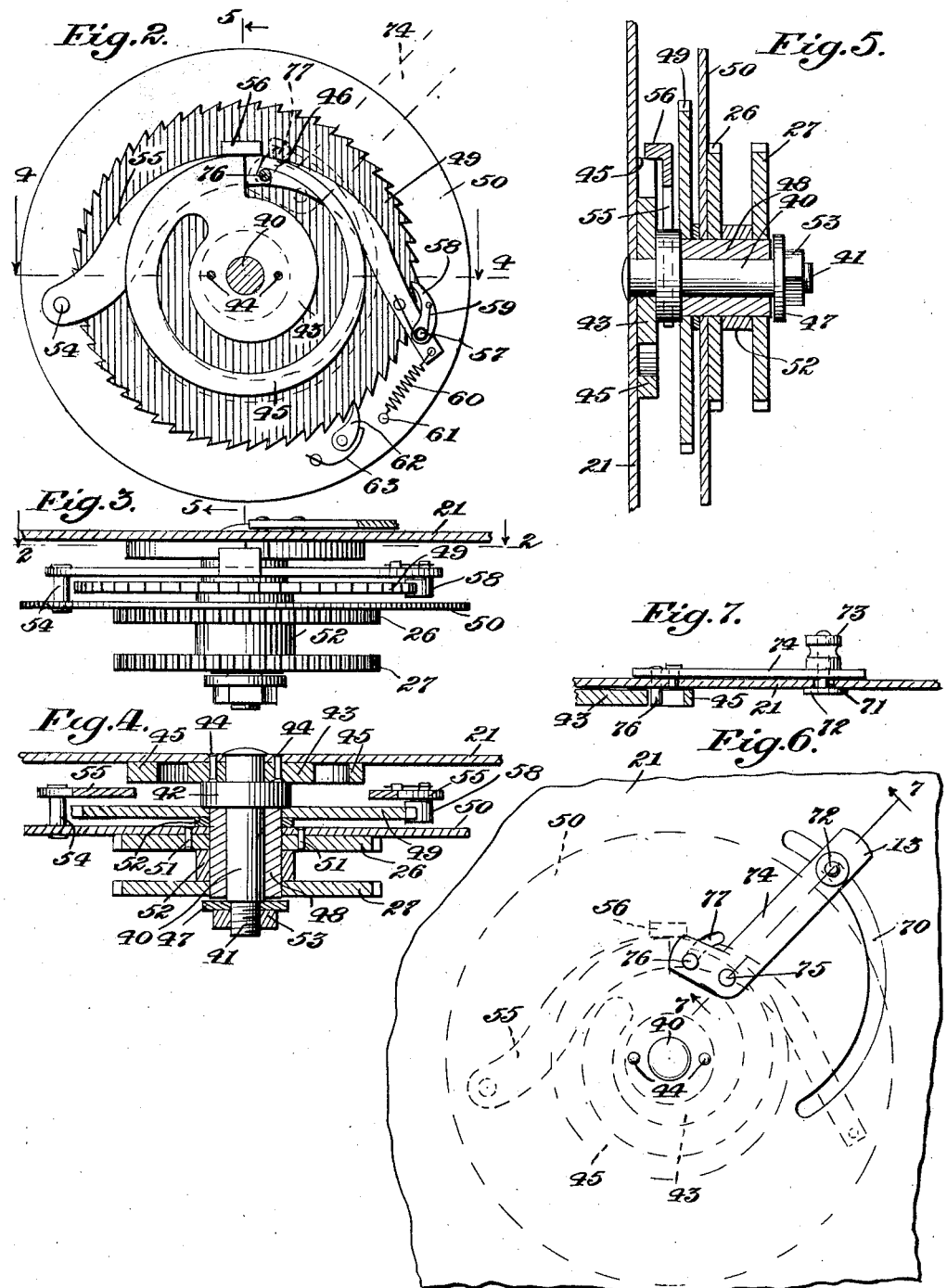

Patented June 5, 1934

UNITED STATES PATENT OFFICE 1,961,414

FLOW METER FOR LIQUIDS

James M. Dayton, Torrington, Conn.

Application March 23, 1931, Serial No. 524,721

11 Claims. (Cl. 235—1)

This invention relates to improvements in flow meters for liquids whereby the same are made capable of registering accurately the volume of flow of liquids.

In co-pending application Serial No. 419,693, filed January 9, 1930, a flow meter has been described with a counting mechanism, and means for calibrating or standardizing the reading of the counting mechanism with respect to the volume of delivery from the flow meter.

In co-pending application Serial No. 167,799, filed February 12, 1927, a compensating device has been disclosed which permits a continuous or continual rotation of a driver member, without the necessity of periodic return movements for restoration of the compensating mechanism to an initial position, and intended for interpolation between the driver member and counting mechanism for the purpose of producing a desired movement of the counting mechanism in response to a particular movement of the driver mechanism, whereby the volume measuring device proper is caused to give the correct and accurate reading of the volume passed by said device.

According to the present invention, a flow meter is provided with a counting mechanism and a compensating device whereby variations in the construction or manufacture of the counting mechanism may be compensated so that a correct and accurate reading of the counting mechanism is produced.

Another feature of the present invention is a modified type of continually or continuously rotatable compensator, which may be adjusted in a direct and positive manner by controlling the shape of the operating cam.

A further feature of the invention is the provision of a compensator which may be easily included in a gear train between the volume measuring device and the counting mechanism.

With these and other objects in view, as will appear in the course of the following specification and claims, an illustrative form of the device is set forth in the following specification, and on the accompanying drawings in which:

Figure 1 is a diagrammatic view showing a flow meter and a counting mechanism and compensator connected thereto.

Figure 2 is a sectional view taken at right angles to the axis and substantially on line 2—2 of Figure 3.

Figure 3 is a side elevation of the compensating mechanism.

Figure 4 is an axial sectional view substantially on line 4—4 of Figure 2.

Figure 5 is an axial section substantially on line 5—5 of Figure 2.

Figure 6 is a plan view of the cover plate, showing the adjusting elements for the cam.

Figure 7 is a detail view substantially on line 7—7 of Figure 6.

Figure 8 is a diagram showing a gear connection between the flow meter, the compensating mechanism and the counting and indicating mechanism.

In the drawings, the flow meter 10 is of any suitable type such as the Worthington flow meter described and shown in my co-pending application Serial No. 167,799, referred to above. This meter is provided with an inlet 11 and an outlet 12 for the liquid which is measured thereto. Such meters ordinarily include a by-pass adjustment 13 for compensating the particular meter by reasons of differences in dimensions of parts arising in construction and assembly, so that all meters have a substantially uniform number of revolutions of the shaft 14 for the passage of a given volume and at a given rate of flow. It is found, however, that in practice that upon variations of the rate of flow through such meters the number of rotations for the shaft 14 of a given volume will vary. Under laws of certain states, the accuracy of reading of an indicating or counting mechanism connected to the shaft 14, with respect to the actual volume delivered from the outlet 12, must be within a certain limit. Thus, for a delivery of five gallons, the accuracy must be within three and one-half (3½) cubic inches, whether the rate of flow be five gallons per minute or twenty gallons per minute. This is a much lower limit of error than can be attained with the use of a standard meter and by-pass arrangement. It is found that the readings will vary by reason of the flow through the by-pass which is substantially unobstructed, while the flow through the metering device proper, i. e. through the measuring chamber for effecting a movement of the nutating piston, for example, is retarded by the work exerted in moving the piston, and by reason of the changes in reversals of direction of the liquid in passing through the measuring device. Hence, the proportion of flow through the by-pass to the flow through the metering device proper will vary at different rates of discharge.

It has now been found that when the by-pass is closed, either by providing no by-pass in the meter or by shutting off the by-pass if provided, the number of rotations of the shaft 14 occasioned by the movement of the piston is substantially constant, within the above limits of accuracy, at the stated rates of flow. The losses by leakage around the piston and other parts of the device are so small as to play practically no part in the accuracy of the meter at either five gallons per minute or twenty gallons per minute, or at any rate of flow therebetween.

Therefore, the by-pass adjusting device 13 on the meter is manipulated until the by-pass is closed.

The shaft 14 is connected by gearing 14a to the shaft 14b which is extended through a bearing bracket 20 on the plate 21 of the counting mechanism case, and is provided at its upper end with a bevel gear 22 which is in driving engagement with the bevel gear 23 on a shaft 24 which is journaled in the plate 21. Fixed to the shaft 24 is a spur gear 25 which is in mesh with a spur gear 26 (Figs. 3 and 8) of the compensating mechanism. A second spur gear 27 of the compensating mechanism is in mesh with a spur gear 28 on a shaft 29 which is journaled in and passes through the plate 21 and serves to operate a counting mechanism in well known manner, the shaft 29 therefore being a portion of the counting mechanism itself. As described in my co-pending application Serial No. 191,368, filed May 14, 1927, there has been described the provision of a central shaft 30 attached to one of the hands of an indicating device which serves to count the quantity of the particular delivery of liquid. This shaft 30 is provided with a cam 31 for operating the trip member 32 connected to the gong clapper lever 33 having a clapper 34 for contacting with the gong 35, when free to be drawn by its spring 36.

The specific construction of the flow measuring device proper, of the counting mechanism, and of the indicating and gong system, form no part of the present invention, and are not shown in detail in the drawings: and reference is made to the aforesaid co-pending applications as indicating types of construction adaptable for such use.

The plate 21 supports a spindle 40 having a threaded end 41. The other end of the spindle is secured to the plate 21, as for example, by upsetting or riveting its head. A collar 42 is provided on the spindle.

A cam member comprises a central portion 43 which is secured to the plate 21 by rivets 44 and a peripheral portion 45 which is of gradual decreasing radial thickness from the junction with the central portion 43 to the free end 46. Between the peripheral portion and the central portion 43 is an annular space extending for substantially the periphery of the cam and permitting the free inward and outward movement of the end 46, and a smaller but regular radial movement of intermediate points of the peripheral portion, determined by the radial thickness of this peripheral portion at a particular point.

Surrounding the spindle 40 and held in position thereon by the collar 42 and a washer 47 is a sleeve 48 which is fixedly connected with a ratchet wheel 49 of say two hundred and forty (240) teeth. The gear 27 is likewise connected to this sleeve 48. Loosely rotatable around the sleeve 48 is a plate 50 which has the gear 26 rigidly connected thereto as by the rivets 51. Spacer members 52 are provided to hold the parts in their true radial planes. A nut 53 holds the washer 47 against the shoulder on the spindle 40, while permitting a slight play and hence freedom of movement of rotation of the several parts with respect to one another.

A pivot 54 on the plate 50 carries the compensating lever 55 which has a lug 56 turned out of its radial plane and axially directed so that the lug will ride against the outer surface of the peripheral portion 45 of the cam (Fig. 5). The free end of the compensating lever 55 has a pivot 57 for the ratchet dog or pawl 58 engaging with the ratchet 49. A spring 59 holds the dog 58 in engagement. A coil spring 60 is attached to the free end of the lever 55 and to a post 61 on the plate 50, and tends constantly to draw the compensating lever 55 in a clockwise direction about its pivot 54 in Figure 2. A retaining pawl 62 is pivoted on the plate 50 and is maintained in contact with the teeth of ratchet wheel 49 by a spring 63.

In the plate 21 is formed an arcuate slot 70 which receives the stem 71 of a bolt 72 which has a thumb nut 73 (Fig. 7), so that by turning the thumb nut 73 the bolt may be caused to clamp the adjusting lever 74 tightly to the plate 21 at any desired point along the arc of the slot 70. In Figure 6, it will be seen that the adjusting lever 74 has a pivot 75 in the plate 21, and a pin 76 on the end of the lever passes through a second arcuate slot 77 of the plate 21 and into the annular space between the peripheral portion 45 and the central portion 43 of the cam, engaging the cam close to its free end 46 (Figure 2). Hence, a clockwise movement of the lever 74 in Figures 2 or 6 about the pivot 75 will cause an outward movement of the pin 76 and therewith a corresponding outward movement of the free end 46 of the peripheral portion of the cam.

In operation, liquid is forced from the inlet 11 to the outlet 12 through the flow meter with the by-pass thereon closed. The meter thus occasions a rotation of the shaft 14 which corresponds to the volume which has passed through the measuring device of the meter and has moved the piston thereon. The shaft 14b through gears 22, 23 and 25 causes a rotation of gear 26 and the plate 50 fastened thereto, in a counter-clockwise direction in Figure 2. As the plate 50 rotates, the lug 56 is drawn over the outer surface of the peripheral portion 45 of the cam. In the position shown in full lines in Figure 2, the outer surface of the peripheral portion 45 of the cam is substantially a circle, and hence no radial movement of the lug 56 with respect to the axis of spindle 40 is occasioned, and hence the dog 58 on lever 55 causes the ratchet wheel 49 to turn at the same angular speed as the plate 50. The ratchet wheel 49 through the sleeve 48 drives the gear 27 and thus the gear 28 and finally the shaft 29 of the counting mechanism C and other registering, indicating and alarm portions of the mechanism.

However, if the adjusting lever 74 be moved in a clockwise direction about its pivot 75, the free end 46 of the cam is moved outwardly, for example, to the position shown in dotted lines in Figure 2. In this case during the counter clockwise movement of the plate 50, the lug 56 of the compensating lever 55 is forced radially outward with respect to the axis of spindle 40, in proportion as the plate 50 turns. This movement of the compensating lever 55 produces through the dog 58 an increased rotational movement of the ratchet wheel 49 with respect to the plate 50, so that the ratchet wheel and its gear 27 are driven at a greater angular speed than the plate 50 and gear 26. Hence, the gear 28, the counting mechanism C and shaft 29 are also driven at a different and greater speed than before: and in this way the counting mechanism is caused to indicate a greater quantity for a given number of rotations of the shaft 14. Hence, an exact compensation may be made for the variations in construction of a flow measuring device, according to the particular position occupied by the adjusting lever 74, and the outward displacement of the free end 46 and other portions of the cam 45 thus occasioned.

During the radially outward movement of the lug 56, the lever 55 has been pulling on the coil spring 60. When the lug 56 passes over the free end 46 of the cam 45, this spring pulls the lug 56 backward until it is again brought into contact with the cam (position shown in Fig. 2). During this quick inward movement of the lug 56 in respect to the axis of spindle 40, the dog 58 slides freely backward and along the ratchet wheel 49, which for this interval is held against return movement by the locking pawl or dog 62.

It will be noted that with a large number of teeth on the ratchet wheel 49 the accuracy may be determined to any desired degree. By the employment of 240 teeth, for example, and by so arranging the parts in the gearing that the compensator revolves approximately once for each gallon of delivery, a reading can always be accomplished which on the average will be accurate to within one-half cubic inch per gallon and which thus will fall within the statutorily required accuracy of 3½ cubic inches per five gallons as aforesaid. The gearing ratio can always be established so that the error is less than one cubic inch per gallon, but this is not always sufficient to satisfy the statute. When this gearing ratio has been established, however, the remaining error can be brought to less than the statutory amount by adjusting the cam. If the error is less than one-half cubic inch, it falls within the statutorily permitted quantity (i. e. it is not over 3½ cubic inches per five gallons). If the error in the meter is exactly one-half cubic inch, the gearing may be so assembled that the error will read either plus or minus, and the net error in either event is within the statutory tolerance. If the error is greater than one-half cubic inch the adjustment can be made to bring the reading to the difference between the fraction and unity. Hence, the error can never exceed 2½ cubic inches per five gallons. This has been found true in actual practice and construction of such a device. The invention is not limited to any specific number of teeth and if greater accuracy is required or lesser accuracy is sufficient, the number of teeth may be increased or decreased accordingly.

It will be understood that deliveries are usually controlled by observing the dial and discontinuing delivery when the indication thereof is exactly at 5 gallons (1155 cubic inches).

This operation, when the quantity actually dispensed is about one-fourth cubic inch per gallon higher than the indicator reading, (the compensator then being inactive) may be represented by the following table:

Table I

| Nominal gallons | Actual inches | Gear drive to indicator | Delivery error | Correction | | Total indicator movement | Indicator error |
|---|---|---|---|---|---|---|---|
| | | | | Per gal. | Total | | |
| 1 | 231¼ | 231 | ¼ high | 0 | 0 | 231 | ¼ low |
| 2 | 462½ | 462 | ½ " | 0 | 0 | 462 | ½ " |
| 3 | 693¾ | 693 | ¾ " | 0 | 0 | 693 | ¾ " |
| 4 | 925 | 924 | 1 " | 0 | 0 | 924 | 1 " |
| 5 | 1156¼ | 1155 | 1¼ " | 0 | 0 | 1155 | 1¼ " |

On the other hand, if the meter-gearing-indicator assembly has a final error so that the meter reading is three-fourths cubic inch low per gallon, then the fixed cam is adjusted so that the arm 55 moves its pawl 58 through at least one tooth distance for each revolution of the plate 50 and hence five successive corrections of one tooth each will be made during the five-gallon dispensing operation, each of these teeth corresponding to an indication of one cubic inch. The result of this is indicated by the following table:

Table II

| Nominal gallons | Actual inches | Gear drive to indicator | Delivery error | Correction | | Total indicator movement | Indicator error |
|---|---|---|---|---|---|---|---|
| | | | | Per gal. | Total | | |
| 1 | 230¾ | 230 | ¾ high | 1 | 1 | 231 | ¼ high |
| 2 | 461½ | 460 | 1½ " | 1 | 2 | 462 | ½ " |
| 3 | 692¼ | 690 | 2¼ " | 1 | 3 | 693 | ¾ " |
| 4 | 923 | 920 | 3 " | 1 | 4 | 924 | 1 " |
| 5 | 1153¾ | 1150 | 3¾ " | 1 | 5 | 1155 | 1¼ " |

In the instance given by the first of these tables, fractional deliveries, or those of less than five gallons, will each carry with them their own specific portion of the total error, as the compensator is not acting.

With the instance given by the second table, the maximum inaccuracy will be the peripheral length of one tooth, and the minimum, zero, with any particular reading always falling within these limits so that in normal course during the dispensing of even five gallons, the smaller corrections will substantially balance the larger corrections.

In Figure 8, the train of connection for the operation is illustrated diagrammatically, with the shaft 29 connected through reducing gearing 80, 81, 82 to the shaft 30 which has the hand 83 thereon, and to the gear 84 of the counting mechanism C.

It is preferred in practice to have the peripheral portion 45 of the cam of decreasing radial dimension from the connection with the central portion 43 of the cam, toward the free end 46 thereof, in such manner that a proportionate outward movement occurs along the cam, so that for example at a distance half way from the free end 46 to the said connection, the outward movement is substantially one half of the outward movement at the free end 46. This affords a regularly proportioned outward movement along the cam so that the compensation occurs regularly for substantially the entire rotation of the plate 50 with respect to the cam. At the end of the outward movement of the lug 56, it therefore falls from the maximum radial dimension from the peripheral surface of the cam to the minimum radial dimension thereof, and the operation repeats itself during the continued rotation of the plate 50. The difference between the maximum and minimum radial dimension of the cam, being the "offset" of the cam or distance by which the cam moves the lug 56 during compensation, determines the increment of speed which is given to the ratchet 49 with respect to the movement of the plate 50.

It is obvious that the invention is not limited to the form of construction illustrated and described, but that the invention may be employed in many ways of the scope of the appended claims.

Having thus described the invention, what I claim as new and desire to secure by Letters Patent, is:

1. In a compensating device, a fixed cam of variable offset, means to vary the offset of the cam, a driver member, a driven member, and means actuated by the driver member to move said driven member, said means including an element in contact with said cam and controlled thereby to cause the driven member to be moved at a speed greater than the speed of the driving member, said increase of speed being dependent upon the distance of offset of said cam.

2. A compensating device including a cam having a fixed central portion and a yielding peripheral portion, means to move the peripheral portion to points of greater or lesser offset, a driver member, a driven member, and means actuated by the driver member to move said driven member, said means including an element in contact with said cam and controlled thereby to cause the driven member to be moved at a speed greater than the speed of the driving member, said increase of speed being dependent upon the distance of offset of said cam.

3. A compensating device including a cam member having a spiral peripheral surface, means to vary the offset of said spiral surface, a driving member, a driven member, a clutch for connecting said members in driving relationship, and means operated by driving engagement on said cam member to cause said driven member to move faster than said driving member.

4. A compensating device including a fixed cam having a spiral surface of limited length, driving and driven members co-axial with said cam, a compensating lever pivoted on one of said members, means on said lever for engaging said other member, and means on said lever actuated by the spiral surface for modifying the driving relationship from said driving member through said lever to said driven member, said modifying means passing from one portion of said spiral surface to another portion thereof at the end of said limited length.

5. A compensating device as in claim 4, including means to vary the offset of said spiral surface.

6. A compensating device including a cam, a plate and a ratchet wheel co-axially mounted, a lever pivoted on said plate, a pawl on said lever engaged with said wheel, a finger on said lever engaged with said cam, and resilient means connecting said lever and plate to hold said finger against said cam.

7. A compensating device as in claim 6, including a retaining pawl pivoted on said plate and engaged with said wheel.

8. A compensating device for a counting mechanism having a base plate and a counting shaft extending through said plate, and a driving shaft parallel to said counting shaft, comprising a fixed spindle, a spiral cam fixed to said plate and co-axial with the spindle, a sleeve around said spindle having a ratchet wheel and a first gear fixed at the ends thereof, a plate and a second gear fixed thereto and located between said wheel and gear for co-axial movement about said sleeve, a lever pivoted to said plate and rocked by said cam, a pawl on said lever for engaging said wheel, a retaining pawl on said plate for engaging said wheel, and gears on said shafts in mesh with said first and second gears.

9. In a measuring apparatus including a meter and a shaft actuated thereby, a mechanism for indicating the operation of said meter, and a single driving train for connecting said shaft and indicating mechanism whereby said shaft drives said indicating mechanism; a compensating device connected in said train and revolving with an element thereof, and a fixed abutment having a surface in contact with which said device travels during its movement and thereby is actuated co-ordinately with its revolution with said element so that the indicating mechanism is advanced at a different rate than that occasioned by said train independently of said device and abutment.

10. In a compensating device, a frame, a driver member rotatable relative to said frame, a cam member fixed on said frame and having a surface spirally arranged with respect to the axis of the driver member, a driven member rotatable about said axis, and means actuated by said driver member for moving said driven member and including an element controlled by said spiral surface for causing said driven member to be moved at an angular speed greater than that of said driver member dependent upon the spiral offset of said surface.

11. A compensating device as in claim 10, in which means are provided for moving said element rapidly from one end of said spiral surface to the other upon completion of one cycle of engagement of said element with said spiral surface during the continued rotation of said members, and means for preventing the movement of said driven member during such rapid movement of said element, so that the compensative function of said cam member is repeated during the rotation of said driver member for substantially the entire angular extent thereof.

JAMES M. DAYTON.